United States Patent
Lee et al.

(10) Patent No.: US 12,520,994 B2
(45) Date of Patent: Jan. 13, 2026

(54) POWER-PROVIDING APPARATUS FOR MEDICAL DEVICE, HAVING REAR SUPPORT

(71) Applicant: MEDINTECH INC., Seoul (KR)

(72) Inventors: Chi Won Lee, Namyangju-si (KR); Myung Joon Kim, Gwacheon-si (KR); Suk Gyu Koh, Seoul (KR)

(73) Assignee: MEDINTECH INC., Seoul (KR)

( * ) Notice: Subject to any disclaimer, the term of this patent is extended or adjusted under 35 U.S.C. 154(b) by 0 days.

(21) Appl. No.: 18/288,178

(22) PCT Filed: Dec. 6, 2022

(86) PCT No.: PCT/KR2022/019711
§ 371 (c)(1),
(2) Date: Oct. 25, 2023

(87) PCT Pub. No.: WO2023/106794
PCT Pub. Date: Jun. 15, 2023

(65) Prior Publication Data
US 2024/0237878 A1    Jul. 18, 2024

(30) Foreign Application Priority Data
Dec. 8, 2021  (KR) .................. 10-2021-0174965

(51) Int. Cl.
*A61B 1/00* (2006.01)
*A61B 1/005* (2006.01)

(52) U.S. Cl.
CPC ...... *A61B 1/00029* (2013.01); *A61B 1/00128* (2013.01); *A61B 1/0016* (2013.01); *A61B 1/0051* (2013.01)

(58) Field of Classification Search
CPC ... A61B 1/00025; A61B 1/00029; A61B 1/01; A61B 1/0016; A61B 1/00133;
(Continued)

(56) References Cited

U.S. PATENT DOCUMENTS

| | | | |
|---|---|---|---|
| 2010/0175701 A1* | 7/2010 | Reis ............... | A61B 34/30 74/461 |
| 2012/0071895 A1* | 3/2012 | Stahler ............ | A61B 34/35 606/130 |

(Continued)

FOREIGN PATENT DOCUMENTS

| | | |
|---|---|---|
| CN | 111067470 A | 4/2020 |
| CN | 111803010 A | 10/2020 |

(Continued)

OTHER PUBLICATIONS

International Search Report for PCT/KR2022/019711 mailed Mar. 14, 2023 from Korean Intellectual Property Office.
(Continued)

*Primary Examiner* — Ryan N Henderson
(74) *Attorney, Agent, or Firm* — Harvest IP Law, LLP

(57) ABSTRACT

The present invention relates to a power providing apparatus for a medical device, including: a power source configured to generate power; a power transmission part configured to transmit the power generated by the power source; a power providing part configured to provide the power received from the power transmission part to a medical device; a power providing part support supporting the power providing part and having a power providing part engagement portion operably engaging the power providing part; and a rear support disposed adjacent to the power providing part to inhibit rearward pushing of the power providing part.

8 Claims, 8 Drawing Sheets

(58) Field of Classification Search
CPC ... A61B 1/00147; A61B 1/005; A61B 1/0051; A61B 1/0052; A61B 1/0053; A61B 1/0057
See application file for complete search history.

(56) References Cited

U.S. PATENT DOCUMENTS

| | | | |
|---|---|---|---|
| 2015/0080658 A1 | 3/2015 | Chung et al. | |
| 2015/0080907 A1* | 3/2015 | Herrell | A61B 1/0016 606/130 |
| 2020/0297189 A1 | 9/2020 | Ikeda et al. | |
| 2021/0068624 A1 | 3/2021 | Shin et al. | |
| 2023/0104573 A1* | 4/2023 | Sholev | A61B 1/00042 600/102 |

FOREIGN PATENT DOCUMENTS

| | | |
|---|---|---|
| JP | 04-071523 A | 3/1992 |
| JP | 04-197235 A | 7/1992 |
| JP | 05-305054 A | 11/1993 |
| JP | 05-309066 A | 11/1993 |
| JP | 06-105800 A | 4/1994 |
| JP | 3372273 B2 | 1/2003 |
| JP | 2021-514743 A | 6/2021 |
| KR | 10-2015-0030949 A | 3/2015 |
| KR | 10-2059491 B1 | 12/2019 |
| WO | 2009-035051 A1 | 3/2009 |

OTHER PUBLICATIONS

Office Action of Japanese Patent Application No. 2024-534367 dated Jul. 22, 2025.
The extended European Search Report of European Patent Application No. 22904624.8 dated Apr. 11, 2024.

* cited by examiner

POWER-PROVIDING APPARATUS FOR MEDICAL DEVICE, HAVING REAR SUPPORT

TECHNICAL FIELD

An aspect of the present disclosure relates to a power providing apparatus for a medical device and, more particularly, to a power providing apparatus internally provided with a power source for providing power to a medical device such that the medical device may operate.

BACKGROUND ART

The information disclosed in this section is only provided for an understanding of background information of embodiments of the present disclosure and should not be taken as a description of the prior art.

An endoscope generally refers to a medical instrument for examining the interior of the body for medical purposes. Such an endoscope may be referred to as a "bronchoscope," a "gastric endoscope," a "laparoscope," or a "colonoscope," depending on the area to be examined therewith. Unlike most other medical imaging devices, the endoscope is inserted directly into the body to capture images of internal organs, located inside the body.

Due to the development of optical fibers and the rapid development of optical technology and electronics, endoscope technology has reached the stage of the current electronic endoscope and has made a great contribution to the development of the field of gastroenterology. With the development of the electronic endoscope, the electronic endoscope is used not only in the diagnostic field to directly look into and perform histological examinations of a subject's body, but may also replace invasive surgery due to the rapid development of various treatment endoscopes.

The configuration of the endoscope may generally include an insertion tube configured to be inserted into the patient's body with a bendable section and a flexible portion, a control body connected to one end of the insertion tube to control the bending motion of the bendable section, a connector coupled to a light source, or the like, and a universal code separating the control body and the connector.

The endoscope has a structure in which a mechanical cord (or cable) is disposed between the bendable section and the control body to control the bending motion of the bendable section, and the mechanical cord is connected to a control knob disposed on the control body. According to the structure of the endoscope, when the user, i.e., a doctor, manually operates the control knob, the mechanical cord transmits power to enable the bendable section to perform the bending motion.

An endoscopic system may include an endoscope, a light source, and an image processing device. A generally known conventional endoscopic system includes a light source device emitting light to view organs inside the body, an image sensor receiving light signals of the light input from the light source device and reflected from the surface of the organs inside the body and converts the light signals into electrical signals (image signals), and a camera including a camera chip including an encoder converting the image signals into electronic signals for observation through a monitor, the camera being provided at a leading edge of the endoscope.

The light source generally includes a light source disposed in a housing to generate light, an air pump configured to pump air, various electronic components, and the like, wherein a control panel is disposed on the front side to enable the user to operate the endoscope, and a connector receptacle of the endoscope is provided. The endoscope is internally equipped with a light guide cable composed of light fiber to transmit light, and when the connector of the endoscope is coupled to the connector receptacle, the light source inside the light source device and the light guide cable of the connector are connected to provide light.

In the endoscope system, a user couples the endoscope to the light source or image processing device to use the endoscope, and after using the endoscope, the endoscope is disconnected from the light source to clean, maintain, and manage the endoscope. In order to use the endoscope, the user repeatedly removes and attaches the light source and the endoscope, and during the removal process, a power transmission system inside the light source may be impacted, causing the light source device to fail or be damaged.

When an endoscope system fails, it is time consuming and labor-intensive to repair. In some cases, patients may not be able to receive medical care in time.

Therefore, there is a need to develop new structures to improve the durability of endoscopic systems.

In particular, automated endoscopes that do not rely on manual knob operation by the doctor but are activated by power are being studied. In such endoscopes, a power transmission system may be added to the connector, and mechanical shocks may occur frequently during the process of adding the power transmission system, and thus, the risk of failure is greater. Therefore, it is urgent to develop a new structure that can secure the durability of the endoscopic system.

The information disclosed in the Background section is technical information that the inventors possessed for, or acquired during, derivation of embodiments of the present disclosure and should not be taken as known technology disclosed to the public before the filing of the embodiments of the present disclosure.

DISCLOSURE

Technical Problem

Accordingly, an aspect of the present disclosure has been made in consideration of the above-described problems occurring in the related art, and the present disclosure provides a power providing apparatus for a medical device, the apparatus having a novel structured power source that is durable enough to withstand repeated attachment and detachment of the medical device.

The objectives of the present disclosure are not limited to the aforementioned descriptions, and other objectives not explicitly disclosed herein will be clearly understood by a person having ordinary knowledge in the art from the description provided hereinafter.

Technical Solution

According to an aspect of the present disclosure, provided is a power providing apparatus for a medical device, the apparatus including one or more among: a power source configured to generate power; a power transmission part configured to transmit the power generated by the power source;

a power providing part configured to provide the power received from the power transmission part to a medical device;

a power providing part support supporting the power providing part and having a power providing part engagement portion operably engaging the power providing part; and a rear support disposed adjacent to the power providing part to inhibit rearward pushing of the power providing part.

In some embodiments, the power providing part engagement portion may include a rail engagement structure formed on the power providing part support and the power providing part.

In some embodiments, the medical device may have a first engagement portion configured to receive power, and the power providing part may have a second engagement portion configured to interact with the first engagement portion to provide power to the first engagement portion.

In some embodiments, the first engagement portion may have a first protrusion or a first recess, and the second engagement portion may have a second recess corresponding to the first protrusion or a second protrusion corresponding to the first recess.

In some embodiments, the medical device may include an endoscope, and the first engagement portion may be disposed on a connector of the endoscope.

In some embodiments, the rear support may be integrally formed with the power providing part support.

In some embodiments, the power providing part support may have a power providing part receptacle formed to engage with the power providing part with a rail structure, and the rear support may have a first side of the power providing part receptacle.

In some embodiments, the rear support may be disposed opposite to a rear side of the power providing part.

In some embodiments, the power providing part may provide power in such a manner as to perform linear motion.

In some embodiments, the medical device may include a bendable section inserted into the subject's body to perform bending motion in order to collect image information of the interior of the subject's body.

Here, the motion of the power providing part may have a range corresponding to a range of bending angles of the bendable section.

Advantageous Effects

According to an embodiment of the present disclosure as described above, provided is the power providing apparatus coupled to the medical device to provide power to the medical device. The power providing apparatus has a novel structure that is durable enough to withstand repeated attachment and detachment of the medical device.

In addition, the present disclosure has a variety of effects with excellent versatility depending on the embodiment, and such effects may be clearly understood from the following description of embodiments.

DESCRIPTION OF DRAWINGS

The following drawings accompanying the specification illustrate embodiments of the present disclosure and, together with the foregoing disclosure, serve to provide further understanding of the technical spirit of the present disclosure, and thus, the present disclosure should not be construed as being limited to the drawings, wherein.

MODE FOR INVENTION

Figure 1:
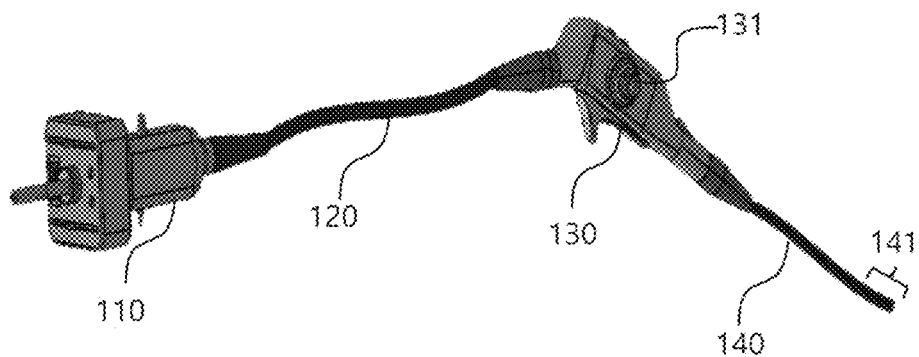
FIG. 1 illustrates an endoscope according to an embodiment of the present disclosure.

Advantages and features of the present disclosure, as well as methods of realizing the same, will be more clearly understood from the following detailed description of embodiments when taken in conjunction with the accompanying drawings. However, the present disclosure is not limited to specific embodiments to be described hereinafter but should be understood as including a variety of modifications, equivalents, and alternatives within the spirit and scope of the present disclosure. Rather, these embodiments are provided so that the description of the present disclosure will be complete and will fully convey the scope of the present disclosure to a person having ordinary skill in the art in the technical field to which the present disclosure pertains. In the following description of the present disclosure, a detailed description of related known technology will be omitted when the description may render the subject matter of the present disclosure unclear.

The terminology used in this application is used to describe specific embodiments only and is not intended to limit the invention. Expressions in the singular include the plural unless the context clearly indicates otherwise.

In the present application, the terms "includes" or "has" and the like are intended to designate the presence of the features, numbers, steps, actions, components, parts, or combinations thereof described in the specification, and are not intended to preclude the possibility of the presence or addition of one or more other features, numbers, steps, actions, components, parts, or combinations thereof. Terms such as first, second, and the like may be used to describe various components, but the components are not to be limited by such terms. Such terms are used only to distinguish one component from others.

Hereinafter, embodiments according to the present disclosure will be described in detail with reference to the accompanying drawings, wherein identical or corresponding components are given the same reference numerals and duplicate descriptions thereof are omitted.

FIG. 1 illustrates an endoscope according to an embodiment of the present disclosure.

Figure 2:
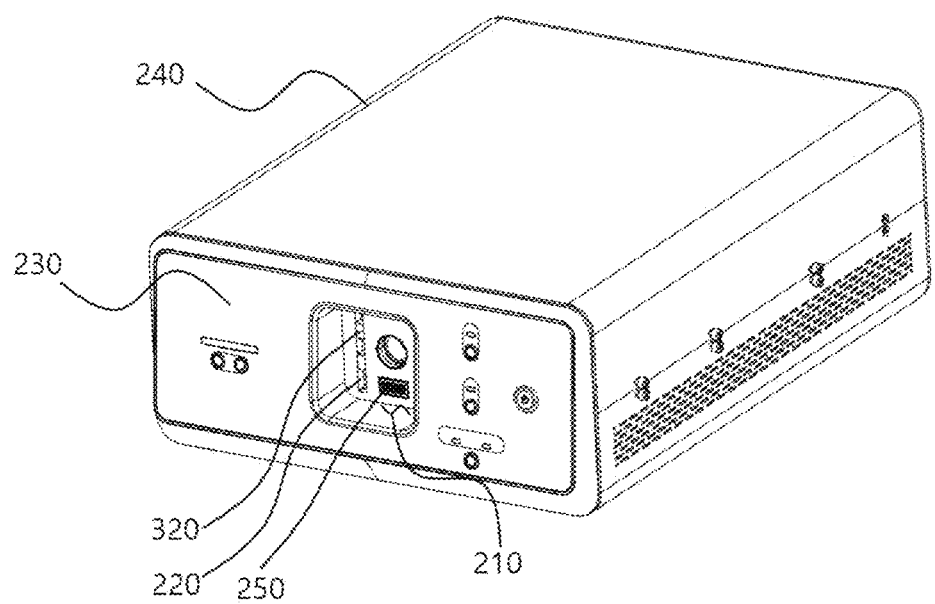
FIG. 2 illustrates a power providing apparatus according to an embodiment of the present disclosure.

FIG. 2 illustrates a power providing apparatus according to an embodiment of the present disclosure.

The power providing apparatus 200 according to an embodiment of the present disclosure may include an apparatus performing a function of providing power to a medical device.

As used herein, a medical device may include an endoscope 100. The endoscope 100 may include an instrument that may be inserted into the patient's body to diagnose, treat, mitigate, cure, prevent a disease, or the like, while collecting imaging information.

In some embodiments, the endoscope 100 may include one or more among an insertion tube 140, a control body 130, a universal cord 120, and a connector 110.

In some embodiments, the control body 130 may be disposed between one end of the insertion tube 140 and one end of the universal cord 120, and the connector 110 may be connected to the other end of the universal cord 120.

The insertion tube 140 may be a portion that is inserted into the patient's body when a user, i.e., a doctor, performs an endoscopy on the patient using the endoscope 100. The insertion tube 140 may include a tube tip, a bendable section 141, and a flexible portion.

The tube tip may be configured to illuminate a target area, collect image information, perform a treatment, or the like. The tube tip may be disposed at the end of the insertion tube, and may include an illumination means for illuminating the interior of the subject's body, an imaging means for imaging the interior of the subject's body, a biopsy channel for collecting tissue from the interior of the subject's body, an air-water channel for spraying air, water, or the like for various purposes, and the like.

The bendable section 141 may perform a bending motion by the user's operation, and may be bent inside the body and travel along the interior of the curved tubular organ. The tube tip may be disposed on the distal end of the bendable section 141, and the distal end of the bendable section 141 may bend in the bending motion to place the tube tip in a direction desired by the user.

The flexible portion may be disposed between the bendable section 141 and the control body 130, and may be a portion that moves along with the bendable section 141 when the bendable section 141 travels through the gastrointestinal tract inside the patient's body.

The control body 130 may be provided with a controller 131 to control the bending motion of the bendable section 141, and may be provided with a flow control valve or flow control switch able to control a flow of air or water or suction. The controller 131 may include, for example, a joystick.

The insertion tube 140 may be connected to one side of the control body 130, and the universal cord 120 may be connected to the other side of the control body 130. The connector 110 may be connected to the distal end of the universal cord 120.

The connector 110 may function to connect the endoscope 100 to an external device. Here, the external device may include a power providing apparatus 200. The power providing apparatus 200 may include, for example, a light source, an image processing device, and the like.

When the endoscope 100 is connected to the light source or the image processing device via the connector 110, the endoscope 100 may receive light from the light source via the connector 110 and illuminate the interior of the patient's body, and the image information about the interior of the patient's body collected by the endoscope 100 may be transmitted to the image processing device via the connector 110.

The universal cord 120 may connect the control body 130 and the connector 110, and may serve to separate the connector 110 and the control body 130 from each other so that a user may move easily when using the endoscope 100 by holding the control body 130. In some embodiments, the universal cord 120 may be omitted and the connector 110 may be connected to the other side of the control body 130.

Figure 3:
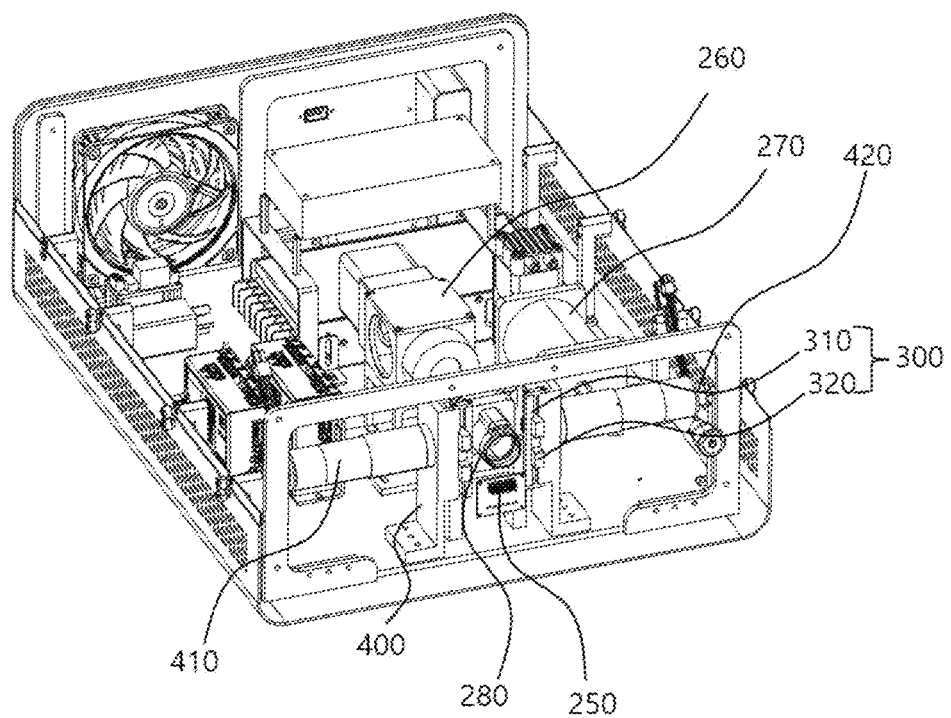
FIG. 3 illustrates an upper housing portion removed from the power providing apparatus of FIG. 2.
Figure 4:
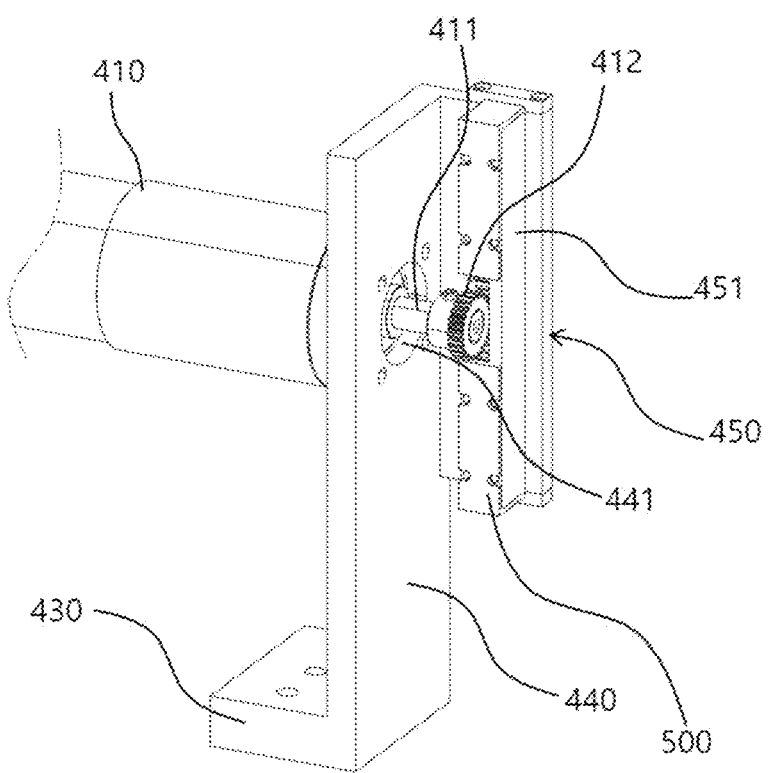
FIG. 4 illustrates a power providing part support according to an embodiment of the present disclosure.

FIG. 3 illustrates the power providing apparatus with an upper housing portion removed therefrom in the state illustrated in FIG. 2, and FIG. 4 illustrates a power providing part support according to an embodiment of the present disclosure.

Figure 5:
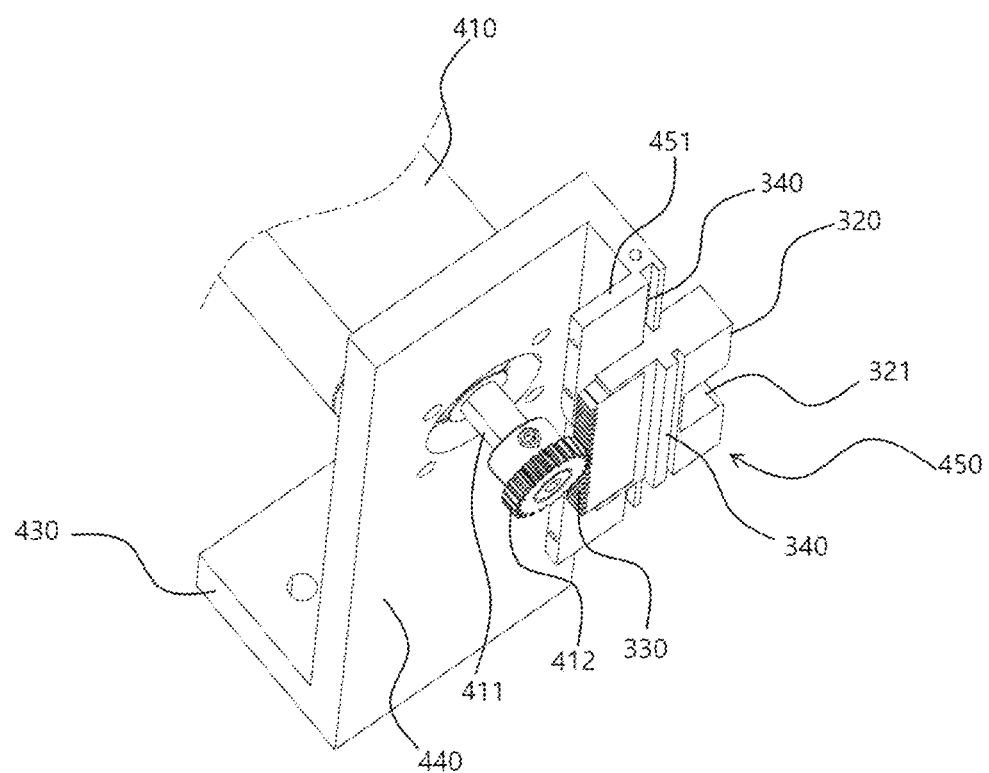
FIG. 5 is a top view illustrating the power providing part support of FIG. 4.
Figure 6:
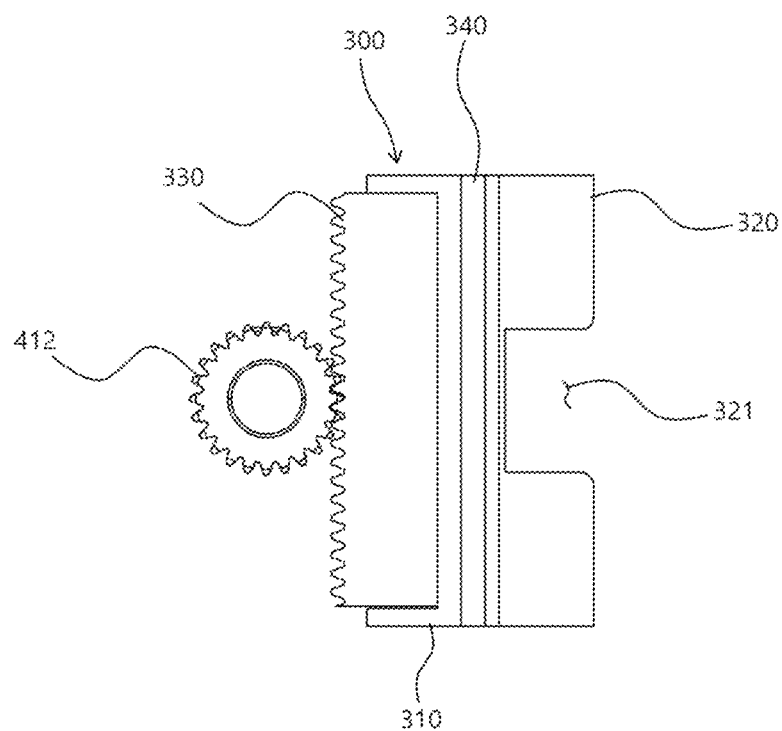
FIG. 6 illustrates a power providing part according to an embodiment of the present disclosure.

FIG. 5 is a top view illustrating the power providing part support of FIG. 4, and FIG. 6 illustrates a power providing part according to an embodiment of the present disclosure.

Figure 7:
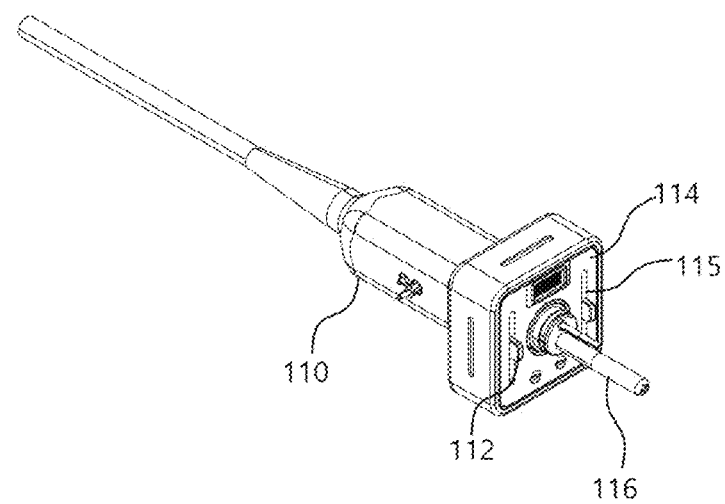
FIG. 7 illustrates a connector of an endoscope according to an embodiment of the present disclosure.
Figure 8:
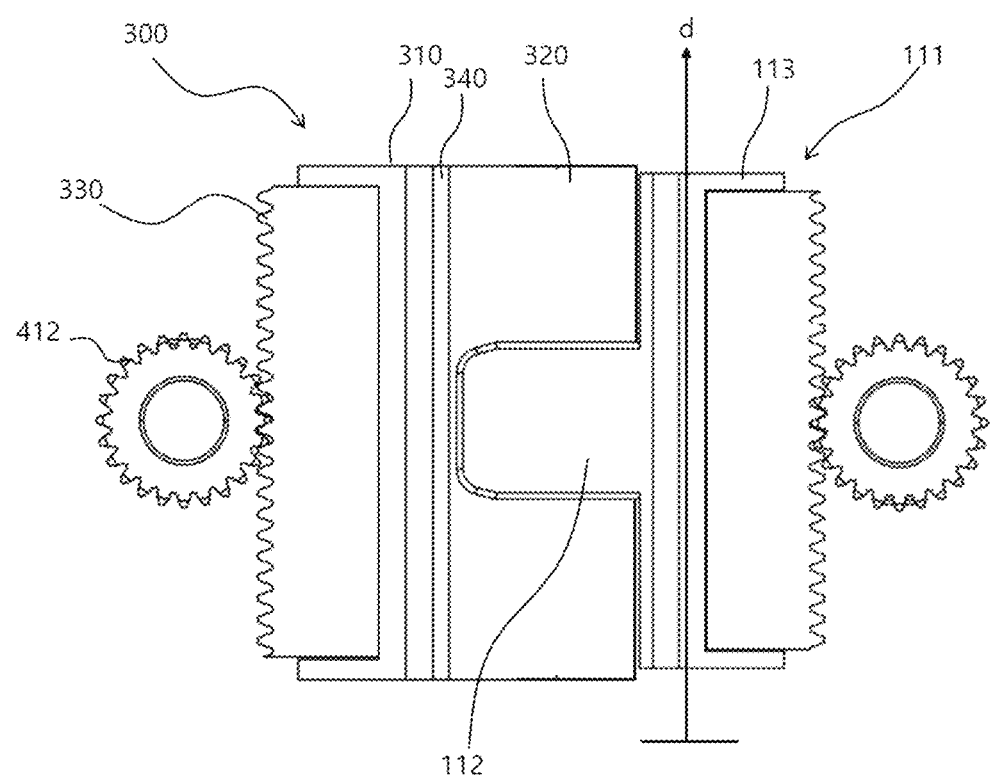
FIG. 8 illustrates the state of first and second engagement portions being engaged with each other according to an embodiment of the present disclosure.

FIG. 7 illustrates a connector of the endoscope according to an embodiment of the present disclosure, and FIG. 8 illustrates first and engagement portions engaged with each other according to an embodiment of the present disclosure.

In some embodiments, a power providing apparatus 200 may include one or more among: a power source 410 generating power; a power transmission portion 330, 412 transmitting power generated by the power source 410; a power providing part 300 operating with the power from the power transmission portion 330, 412 to provide power to a medical device; and a power providing part support 400 that supports the power providing part 300 and has a power providing part engagement portion 340 to which the power providing part 300 is operably coupled.

The power source 410 may include a power generating device. The power source 410 may include, for example, a motor. The power transmission portion 330, 412 may serve to transmit power generated by the power source 410 to the power providing part 300. The power providing part 300 may receive power from the power transmission portion 330, 412 and slide to provide power to the medical device.

The power providing part support 400 may function to support the power providing part 300 so that the power providing part 300 may move along the power providing part support. The power providing part 300 and the power providing part support 400 may be engaged with each other via the power providing part engagement portion 340.

The power providing part engagement portion 340 may include a concavo-convex structure formed in the power providing part support 400 and the power providing part 300 according to embodiments. The concavo-convex structure may have a structure extending in a vertical direction. The power providing part 300 and the power providing part support 400 are engaged with each other by the concavo-convex structure, and the power providing part 300 may be moved linearly up and down on the power providing part support 400 via the concavo-convex structure.

Hereinafter, the power providing apparatus 200 will be described in detail.

A control panel 230 may be disposed on the front of the housing 240 of the power providing apparatus 200. A user may operate the control panel 230 to drive the power providing apparatus 200.

The control panel 230 may be disposed on a front portion of the power providing apparatus 200, and a connector receptacle 210 may be disposed in a center portion of the control panel 230 so that the connector 110 of the endoscope 100 is connected thereto. On an inner side of the front portion of the power providing apparatus 200, the power providing part support 400 may be disposed.

The power providing apparatus support 400 may comprise a body portion 440 formed vertically to support the power source 410, and a bottom fastener 430 and a power providing part receptacle 450, configured to fasten the body portion 440 to the bottom.

The bottom fastener 430 may be formed by a bend in the lower end of the body portion 440, according to embodiments. The body portion 440 and the power providing part receptacle 450 may be formed perpendicularly to each other, i.e., a first plate of the power providing part support 400 constituting the body portion 440 and a second plate on which the power providing part receptacle 450 is formed may be disposed perpendicularly to each other.

The power providing part receptacle 450 may be formed to entirely surround the power providing part 300, according to embodiments. The power providing part 300 may include a body portion 310 and a second engagement portion 320. A rail structure may be formed on both sides of the body portion 310 of the power providing part 300. The rail structure may include a concavo-convex shape according to embodiments.

The power providing part receptacle 450 may have two rail sidewalls 451 facing and surrounding the two sides of the body portion 310 of the power providing part 300. The inner surfaces of the two rail sidewalls 451 may be provided with a rail structure formed thereon. The rail structure of the power providing part receptacle 450 may be formed to correspond to the shape of the rail structure formed on the body portion 310 of the power providing part 300. Such a structure allows the power providing part 300 to slide smoothly within the power providing part receptacle 450.

A through-groove may be formed in the front portion of the power providing part receptacle 450. The through-groove is a structure elongated in a vertical direction.

While the body portion 310 of the power providing part 300 is accommodated in the power providing part receptacle 450, the second engagement portion 320 of the power providing part 300 may pass through the through-groove and be exposed externally. A connector receptacle 210 may be formed on the front side of the power providing part receptacle 450, a through-slot 220 may be formed on an inner surface of the connector receptacle 210, and the second engagement portion 320 may pass through the through-slot 220 and be exposed externally on the inner surface of the connector receptacle 210.

The power source 410 may be disposed and attached to the power providing part support 400. At the opposite end of the portion of the power source 410 that is attached to the power providing part support 400, a location information collecting part 420 may be disposed to collect location information such as a rotation speed, a rotation amount, etc., of a driving shaft 411 of the power source 410. The location information collecting part 420 may include, for example, an encoder.

In the body portion 440 where the power source 410 is disposed, a driving shaft through-hole 441 may be formed so that the driving shaft 411 that is output from the power source 410 may be disposed therethrough. A pinion gear 412 may be disposed at an end of the driving shaft 411 exposed through the driving shaft through-hole 441.

The power providing part receptacle 450 may have an overall shape of a hexahedron. The receptacle may include two rail sidewalls 451, a top sidewall, a bottom sidewall, and a rear sidewall that hold the body portion 310 of the power providing part 300 on both sides so that the body portion 310 may be slidably moved. A through-hole may be formed in a center portion of the rear sidewall, and the body portion 310 of the power providing part 300 may be exposed through the through-hole.

A rear surface of the body portion 310 may be toothed, i.e., a rack gear 330 may be formed. The driving shaft 411 that is output from the power source 410, the pinion gear 412 connected to the end of the driving shaft 411, and the rack gear 330 of the body portion 310 may constitute the power transmission portion 330, 412.

By such a structure, power may be transmitted from the pinion gear 412 to the rack gear 330 by engagement between the rack gear 330 formed at the rear of the body portion 310 and the pinion gear 412 disposed at the end of the driving shaft 411 of the power source 410. That is, when the driving shaft 411 of the power source 410 rotates, the pinion gear 412 rotates to cause the rack gear 330 to move up and down so that the body portion 310 of the power providing part 300 move up and down, and thus the secondary engagement portion 320 integrally formed with the body portion 310 moves up and down.

In some embodiments, the connector 110 of the endoscope 100 includes a power receiving part 111 to receive power transmitted from an external source. The power receiving part 111 may function as a power providing part 300. Inside the connector 110 is a mainframe, and a power receiving part receptacle may be disposed on the front of the mainframe. The power receiving part 111 may be slidably movably connected within the power receiving part receptacle. An inner surface of the power receiving part receptacle and both sides of the power receiving part 111 are respectively formed with rail structures, the shapes of which correspond to each other. This structure allows the power receiving part 111 to slide along the rail structure inside the power receiving part.

The power receiving part 111 may include a first engagement portion 112 and a base portion 113 from which the first engagement portion 112 extends. On either side of the base portion 113, a rail structure is formed to correspond to the shape of and to engage with the rail structure formed on the inner side of the power receiving part receptacle. A through-groove is formed on a front portion of the power receiving part receptacle. The first engagement portion 112 of the power receiving part 111 may pass through the through-groove and be exposed to the outside. A front cover 114 is disposed on the front side of the connector 110 facing the power receiving part 111, and an opening 115 is formed on one side of the front cover 114. The first engagement portion 112 may pass through the through-groove and the opening 115 in turn and may be exposed externally of the connector 110.

When a user engages the connector 110 of the endoscope 100 with the connector receptacle 210 of the power providing apparatus 200, the first engagement portion 112 of the connector 110 and the second engagement portion 320 of the power providing apparatus 200 may be engaged with each other with corresponding shapes.

In some embodiments, the first engagement portion 112 may include a first protrusion or a first recess, and the second engagement portion 320 may include a second recess 321 corresponding to the first protrusion or a second protrusion corresponding to the first recess. In this case, the first protrusion of the first engagement portion 112 and the second recess 321 of the second engagement portion 320 may be engaged with each other with corresponding shapes.

When the connector 110 of the endoscope 100 is coupled to the power providing apparatus 200, the power providing part 300 of the power providing apparatus 200 and the power receiving part 111 are coupled and ready for power to be transferred from the power providing apparatus 200 to the connector 110.

According to embodiments, the power providing part 300 may provide power to the medical device in a vertical linear motion. The mechanical methods for transmitting power from the power providing apparatus 200 to the endoscope 100 may include a variety of methods, but in this embodiment, the configuration may have a slider-like configuration such that the power providing part 300 is engaged with the rail structure formed on the power providing apparatus 200 and travels on the rail structure, and much like the power providing apparatus 300, the power receiving part 111 is engaged with the rail structure formed on the connector 110 and travels on the rail structure.

In such a configuration, movement of the power providing apparatus 300, powered by the power source 410, may cause the power receiving part 111, which is tightly engaged with the power providing apparatus 300, to move together, providing power from the light source device to the connector 110.

Since the first engagement portion 112 and the second engagement portion 320 are made of a material of sufficient thickness and stiffness, the engagement force is very large. Therefore, power may be transmitted without loss. Therefore, when the configuration of the power providing part 300 having the second engagement portion 320 provides power as in the present embodiment, and the connector 110 receiving the power also adopts the configuration of the power receiving part 111 having the first engagement portion 112, the power may be provided accurately and precisely, and problems such as delayed response, uneven response, etc. due to backlash during power transmission may be eliminated.

When the first engagement portion 112 is a protrusion and the second engagement portion 320 is a groove, the edge of the protrusion or groove 321 may be rounded or chamfered. By rounding or chamfering the edges of the protrusion or groove 321, during mutual engagement, the first engagement portion 112 and the second engagement portion 320 may be smoothly engaged and vibration noise may be suppressed.

According to embodiments, the medical device may have a bendable section that is inserted into the subject's body to perform a bending motion in order to collect image information inside the subject's body, wherein the range of motion of the power providing part 300 may be set to correspond to a range of bending angles (or bending angle range) of the bendable section.

In the connector 110, the power receiving part 111 is connected to a power transmission part, which is connected to the bendable section via the universal cord, the control body, and the insertion tube.

Therefore, when the power receiving part 111 receives and transmits power to the power transmission part while performing a vertical linear reciprocating motion in the connector 110, the power transmission part transmits power through the universal cord, the control body, and the insertion tube to the bendable section in the connector 110, and the bendable section receiving the power performs a bending motion.

According to embodiments, the power providing apparatus may include a control command receiver 250 receiving a control command signal for controlling a travel distance D of the power providing part 300 from a medical device; and a power source controller controlling power generation of the power source 410 based on the control command signal received by the control command receiver 250.

The bendable section performs a vertical bending operation and a horizontal bending operation, and the combination of these operations enables realization of a bending operation in all directions. In order to realize this combination of operations, all of the aforementioned configurations, including the power source 410, the power providing part 300, the power providing part receptacle 450, and the power providing part support 400, may be configured in pairs according to this embodiment.

The control command signal may be generated by the controller disposed in the control body, and the control command signal generated in the control body may be transmitted to the power source controller through the universal cord and a control signal terminal disposed in the connector 110, and through the control command receiver 250 disposed in the connector receptacle 210 of the power providing apparatus 200. When a user couples the connector 110 to the connector receptacle 210 in order to transmit the control signal, the control signal terminal of the connector 110 and the control command receiver 250 disposed in the connector receptacle 210 at a position in the connector receptacle 210 corresponding to the position where the control signal terminal of the connector 110 is disposed are electrically coupled. Thus, an electrical control signal may be transmitted. The control command signals may include control commands to control vertical bending and horizontal bending of the bendable section, and the power source controller may receive the control commands to control the power source 410 to provide power. One of the pair of power providing parts 300 may provide power to realize vertical bending of the bendable section, and the other of the pair of power providing parts 300 may provide power to realize horizontal bending of the bendable section.

The pair of power receiving parts disposed in the connector 110 to correspond to the pair of power providing parts 300 may function similarly.

The power providing apparatus 200 of the present embodiment may include, for example, a light source device providing light in combination with the endoscope 100, or an image processing device receiving and processing image information from the endoscope 100 and transmitting the image to a monitor so that a user may view the image.

The light source device having a light source 260 therein or the image processing device capable of processing the image may be equipped with a power source 410, a power source 410 controller, and power transmission part 330, 412 that transmit power generated by the power source 410 to the power providing part. That is, a power providing system capable of providing power to the light source device or the image processing device may be provided.

Hereinafter, the power providing apparatus 200 according to the present embodiment will be denoted as a light source device.

The light source device according to this embodiment may include: a housing 240; a light source 260 disposed inside the housing 240 and generating light; an air pump 270 pumping air; a power providing part; and one or more among the power providing system.

In accordance with embodiments, in the light source device, a pair of power providing part supports 400 may be disposed facing each other with an adjustment spacing offered therebetween. Between the pair of power providing part supports 400 may be disposed a light providing part 280 and an air providing portion. The light providing part 280 may be disposed adjacent to the light source 260 to serve to provide light generated by the light source 260 to the outside. In the endoscope 100, a light guide cable extends from the connector to the tube tip through the universal cord, the control body, and insertion tube.

This structure allows light generated by the light source 260 to be transmitted to the illumination means of the tube tip. A light receiving part 116 and an air receiving part may be disposed in the center of the connector 110, and when a user couples the connector 110 to the connector receptacle 210, the light receiving part 116 and the air receiving part are respectively engaged with the light providing part 280 and the air providing part, being ready to receive light and air.

Here, the light providing part 280 and the air providing part may be mounted on a center support, which may be disposed between the two power providing part supports 400. In this structure, an optical path is arranged for light and air to be transmitted to the center through the connector receptacle 210 and the connector 110, and a pair of second engagement portions 320 for providing power are arranged on both sides of the optical path for transmitting light and air. This structure has advantages, such as being able to increase space efficiency, in a light source device that may transmit power and light simultaneously.

Figure 9:
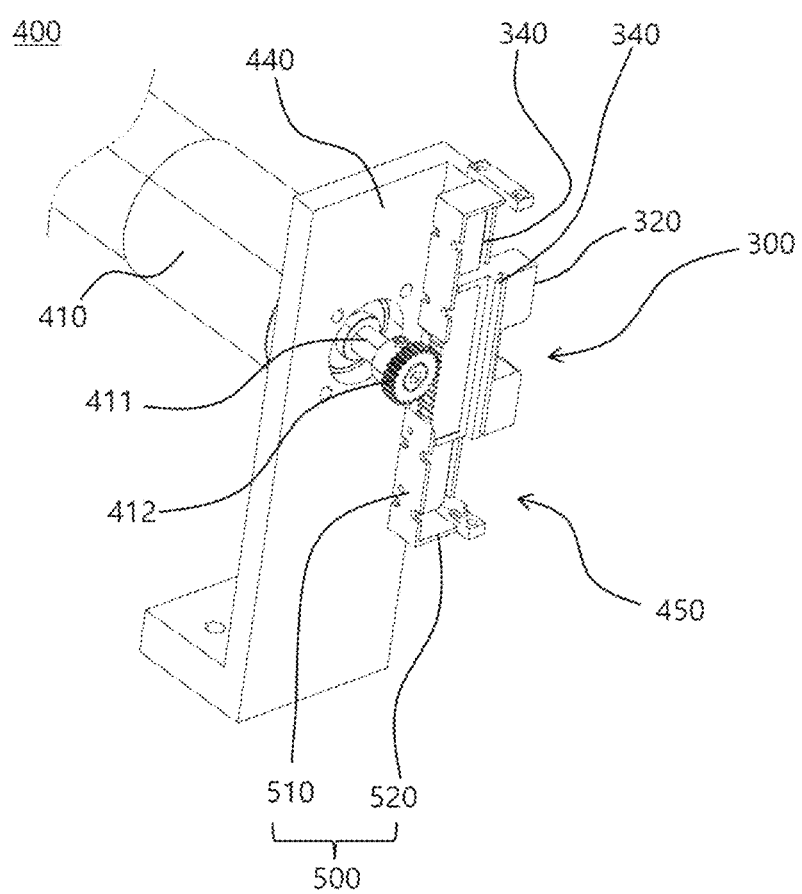
FIG. 9 illustrates a rear support and a stopper disposed in the power providing part receptacle according to an embodiment of the present disclosure.

FIG. 9 illustrates a rear support disposed on a power providing part receptacle according to an embodiment of the present disclosure.

Figure 10:
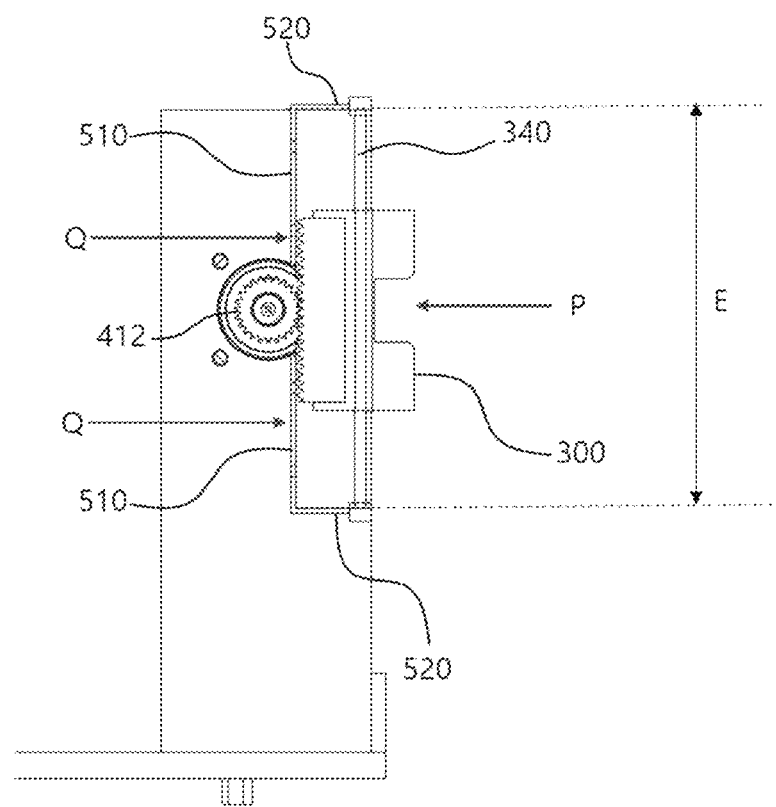
FIG. 10 is a side view illustrating the power providing part, a pinion gear, and the rear support in the power providing part receptacle of FIG. 9.

FIG. 10 is a side view illustrating the power providing part, a pinion gear, and a rear support in the power providing part receptacle of FIG. 9.

A power providing apparatus 200 for a medical device according to an embodiment of the present disclosure may include: a power source 410 generating power; a power transmission part transmitting power generated by the power source 410; a power providing part 300 providing power transmitted from the power transmission part to the medical device;
   a power providing part support 400 supporting the power providing part 300 and having a power providing part engagement portion 340 with which the power r providing part 300 is operatively engaged; and a rear support 510 disposed adjacent to the power providing part 300 and restraining rearward pushing of the power providing part 300.

According to embodiments, the power providing engagement portion 340 may include a rail engagement structure formed on the power providing part support 400 and the power providing part 300.

According to embodiments, the rear support 510 may be disposed adjacent to the power providing part 300 and may function to restrain the power providing part 300 from being pushed rearward.

That is, since in the process of engagement of the connector 110, the power providing part 300 is pushed in a first direction P, the rear support 510 may provide a counterforce in a second direction Q that is opposite to the first direction P, thereby inhibiting the power providing part 300 from being pushed rearward.

The shape of the rear support 510 may include a variety of shapes within the scope of the technical concept of the present disclosure, so long as it is disposed adjacent to the power providing part 300 to perform the function of restraining the power providing part 300 from being pushed rearward.

The rear support 510 may be disposed a certain distance apart from the rear of the power providing part 300. Additionally, the rear support 510 may be disposed opposite the rear of the power providing part 300. The rear support 510 may be configured in various shapes, such as a plate shape, a protrusion shape, etc., according to embodiments.

According to embodiments, the rear support 510 may be integrally formed with the power providing part support 400. In some embodiments, the rear support 510 may include one side of the power providing part receptacle 450. The rear support 510 may include a member constituting a back side of the power providing part receptacle 450, according to embodiments.

The power providing part receptacle 450 may have stoppers 520 located at the top and bottom, respectively, to restrain sliding movement of the power providing part 300, and according to embodiments, the stoppers 520 and the rear support 510 may be integrally formed. According to embodiments, the stoppers 520 and the rear support 510 may be an "L" shaped cover member 500 covering the top, bottom, and back surfaces of the power providing part receptacle 450.

The operation of the rear support 510 will now be described in detail.

The rail structure formed by the power providing part 300 and the power providing part receptacle 450, i.e., the power providing part engagement portion 340, may be designed to have a small gap (when there is no gap, the sliding action would not be possible). Thus, while a user engages the connector 110 with the connector receptacle 210 of the power providing apparatus 200, the power providing part 300 is pushed rearward due to the gap in the rail structure, and then contacts the rear support 510 at a predetermined position, so that the rearward movement of the power providing part 300 is stopped. That is, the power providing part 300 is stopped by the rear support 510 and is no longer pushed rearward.

As a user couples the connector 110 to the connector receptacle 210 of the power providing apparatus 200, the first engagement portion 112 and the second engagement portion 320 engage with each other. At this time, the first engagement portion 112 pushes in a first direction and momentarily presses the power providing part 300, including the second engagement portion 320. That is, a physical collision occurs between the two configurations of the power providing part 300 and the power receiving part. The power providing part 300 is initially supported by the power providing part engagement portion 340 to prevent rearward pushing. However, the primary function of the power providing part engagement portion 340 is to support the power providing part 300 so that the power providing part may move in a particular direction.

Therefore, repeated impacts to the power providing part engagement portion 340 may cause the power providing part engagement portion 340 to bend or break, and a broken power providing part engagement portion 340 may impede the sliding motion of the power providing part 300 moving along the power providing part engagement portion 340.

According to embodiments, the power providing part 300 may provide power in a manner performing linear motion. In addition, according to embodiments, the medical device may have a bendable section that is inserted into the subject's body to perform a bending motion in order to collect image information interior of the subject's body, in which case the range of motion of the power providing part 300 may correspond to the bending angle range of the bendable section.

When the power providing part 300 performs linear motion in the manner described above, the accuracy of the power transmission may be compromised by small sources that impede the movement of the power providing part 300, which may in turn impede accurate positioning of the bendable section, which may be a significant problem in endoscopic procedures.

Furthermore, in a structure in which the body portion of the power providing part support 400 and the power providing part receptacle 450 are vertically disposed according to an embodiment, the rack gear 330 formed on the power providing part 300 engages with the driving shaft 411 extending directly from the power source 410 and the pinion gear 412. In this structure, the driving shaft 411 supporting the pinion gear 412 may bend or break when the power providing part 300 is pushed rearward. This is problematic because the power may not be accurately transmitted or may not be transmitted at all.

A user may be concerned that electrical contact between the connector 110 and the connector receptacle 210 may not be well established, and may habitually push the connector 110 forcefully toward the connector receptacle 210, causing the connector receptacle 210 to push the connector 110 equally forcefully in response.

Since the power providing part 300 is engaged with the power providing part receptacle 450 by the rail structure, the power providing part may withstand a certain amount of impact, but as described above, cannot withstand fatigue due to repeated attachment and detachment with the rail structure alone.

Eventually, due to fatigue caused by repeated attachment and detachment of the connector 110, the rail structure of the power providing part 300 and the power providing part receptacle 450 may deform and fail.

In the present disclosure, the power providing part receptacle 450 has the rear support 510 configuration that inhibits the rearward movement of the power providing part 300, so that even in the case that a user strongly pushes the connector 110 into the connector receptacle 210, the rear support 510 inhibits the rearward movement of the power providing part 300, thereby protecting the rail structure of the power providing part 300 and the power providing part receptacle 450 to improve durability and response accuracy.

On the other hand, in another embodiment of the present disclosure, a power providing apparatus 200 for a medical device may include one or more among: a power source 410 generating power; a power transmission part transmitting power generated by the power source 410; a power providing part 300 that provides power transmitted from the power transmission part to the medical device;

A power providing part support 400 supporting the power providing part 300 and having a power providing part engagement portion 340 to which the power providing part 300 is operably coupled; and a stopper 520 disposed adjacent to the power providing part 300 and limiting the range of motion of the power providing part 300.

According to embodiments, the power providing part engagement portion 340 may include a rail engagement structure formed on the power providing part support 400 and the power providing part 300.

According to embodiments, the stopper 520 configuration may be disposed adjacent to the power providing part 300 and may function to restrict the range of motion of the power providing part 300. For example, when the power providing part 300 performs a linear motion within the power providing part receptacle 450, the stoppers 520 may be respectively disposed at one end (referred to as the first end) and the other end (referred to as the second end) of the linear motion to limit the range of motion such that the power providing part 300 may only move between the first and second ends.

In addition, the stoppers 520 may serve to close the top and bottom of the inner side of the through-slot 220. The top and bottom of the inner side of the through-slot 220 may have openings, and when viewing the connector receptacle 210 side of the power providing apparatus 200 from the outside of the power providing apparatus 200, the openings at the top and bottom of the inner side of the through-slot 220 may cause components to be visually visible inside the power providing apparatus 200, deteriorating the aesthetics of the power providing apparatus 200.

Further, debris such as dust may be introduced into the interior of the power providing apparatus 200 through the openings at the top and bottom of the inner side of the through-slot 220. The stoppers 520 configuration according to this embodiment also function as a cover to close the top and bottom of the inner side of the through-slot 220, which may improve aesthetics, prevent debris from entering, and improve durability.

The shape of the stopper 520 may include a variety of shapes, structures, and configurations within the scope of the technical concept, so long as the stopper is disposed adjacent to the power providing part 300 to function to limit the range of motion of the power providing part 300 such that the power providing part 300 only moves between the first and second ends without deviating therefrom.

The stopper 520 configuration may be designed to have a thickness and stiffness sufficient to structurally limit the range of motion of the power providing part 300, i.e., sufficient to resist the force of a motor that is the power source 410.

The stoppers 520 may include a pair of top stopper and bottom stopper, and the pair of stoppers 520 may be disposed at first and second ends of the power providing part receptacle 450, respectively. According to embodiments, the top stopper may be disposed at a top end of the power providing part receptacle 450 and the bottom stopper may be disposed at a bottom end of the power providing part receptacle 450.

Additionally, the top stopper may be disposed opposite to a top surface of the power providing part 300, and the bottom stopper may be disposed opposite to a bottom surface of the power providing part 300. The stoppers 520 may be formed in various shapes, such as a plate shape, a protrusion shape, etc., according to embodiments.

According to embodiments, the stoppers 520 may be integrally formed with the power providing part support 400. According to embodiments, the stoppers 520 may include a top surface and a bottom surface of the power providing part receptacle 450. The stoppers 520 may include a cover member 500 covering the top surface and the bottom surface of the power providing part receptacle 450, according to embodiments.

According to embodiments, the stoppers 520 and rear support 510 configuration may be integrally formed. According to embodiments, the stoppers 520 and rear support 510 may be an "L" shaped cover member 500 covering the top, bottom, and rear of the power providing part receptacle 450.

The operation of the stopper 520 will now be described in detail.

A control command signal generated by the control body of the endoscope 100 may be transmitted to the power providing apparatus 200 via the connector 110 and the connector receptacle 210, and a power source controller of the power providing apparatus 200 may control the power source 410 in response to the control command. When the power source 410 is a motor, the power source controller may control the generation of power such as rotational direction, rotational speed, rotational force, etc. of the power source 410. However, in the process of generating and transmitting power with a rotating element, an error may occur between the control command and the power provided, and this error eventually becomes a problem in that the accuracy of the bending motion of the bendable section deteriorates.

Therefore, the accuracy of the bending motion may be maintained by presetting the traveling distance d of the power providing part 300 to be traveled in a linear reciprocating motion in the process of transmitting the power, and a user may predict the position of the tube tip of the bendable section.

The configuration of the stopper 520 according to the present embodiment may preset the traveling distance d of the power providing part 300, so that the accuracy of the bending motion may be maintained, and a user, i.e., a doctor, may predict the position of the tube tip, which enables accurate posture control of the bendable section.

The bending angle range of the bendable section may be determined between an upper and lower limit. For example, the bendable section may bend between a first angle and a second angle when performing a vertical bending motion, or between a third angle and a fourth angle when performing a horizontal bending motion. Here, the first and second angles may refer to the upper and lower limits of the vertical bending, and the third and fourth angles may refer to the upper and lower limits of the horizontal bending.

The power providing part 300 controls the bendable section 141 to move within the bending angle range by reciprocating between the first end with the top stopper and the second end with the bottom stopper, where the first end with the top stopper may correspond to the first angle of the bending angle range of the bendable section, and the second end with the bottom stopper may correspond to the second angle. For example, when the power providing part 300 is moved from the first end to the second end, the bendable section 141 may be bent from the first angle to the second angle.

Preferably, the bending angle range of the bendable section 141 is previously determined as a set value. Preferably, the bending angle range of the bendable section 141 is set such that the bendable section may only be bent, for example, from the first angle to the second angle. This allows for precise positioning of the bendable section 141 by a computer through motorization of the endoscope 100, and allows the user, i.e., a doctor, to predict the bending range of the bendable section 141. Predicting the bending range of the bendable section is important because the bendable section moves inside the tubular organ of the patient's body and may cause fatal injury to the patient.

The structure of the stopper 520 according to the present embodiment may improve the precision of the response output by the power providing apparatus 200 by setting the travel distance E and the travel range of the power providing part 300 so that the bending motion of the bendable section 141 precisely conforms to the predetermined bending angle range, and enables the doctor to predict the bending angle range of the bendable section.

The power providing part supports 400 may be disposed in a pair on the inner surface of the front portion of the power providing apparatus where the control panel 230 is located. The pair of power providing part supports 400 may include a first power providing support and a second power providing support. The first power providing part support may provide power for performing a vertical bending motion of the bendable section, and the second power providing part support may provide power for performing a horizontal bending motion of the bendable section.

According to embodiments, the first power providing part support may have a first power providing part receptacle and the second power providing part support may have a second power providing part receptacle.

According to embodiments, the first power providing part support may have a pair of first stoppers restricting movement of the first power providing part, and the second power providing part support may have a pair of second stoppers restricting movement of the second power providing part.

The pair of first stoppers may include a first top stopper and a first bottom stopper, and the pair of second stoppers may include a second top stopper and a second bottom stopper.

According to embodiments, the first top stopper and the first bottom stopper may be provided at both ends of the first power providing part receptacle to limit the vertical bending angle range of the bendable section. In addition, the second top stopper and the second bottom stopper may be provided at both ends of the second power providing part receptacle to limit the horizontal bending angle range of the bendable section.

In some embodiments, a fabricator may utilize the first stopper and the second stopper to set the bending angle range of the bendable section. For example, when the spacing E between the first top stopper and the first bottom stopper is referred to as a first spacing and the spacing between the second top stopper and the second bottom stopper is referred to as a second spacing, the first spacing of the pair of first stoppers may set the vertical bending angle range of the bendable section, and the second spacing of the pair of second stoppers may set the horizontal bending angle range of the bendable section. The first and second spacing need not be the same, and may be set independently.

The stopper 520 structure according to the present embodiment has the advantage that the first spacing of the first pair of stoppers and the second spacing of the second pair of stoppers may be adjusted respectively, so that the vertical bending angle range and the horizontal bending angle range of the bendable section may be set during the manufacturing process.

On the other hand, when the bendable section is bent by being powered by the power source 410, a motor, the power transmission part may provide excessive power to the connector 110 when there is a problem in the power providing part that supplies power to the motor, the motor breaks down, a sudden overcurrent flows to the motor, or the motor malfunctions due to unknown abnormal cause, etc.

Even in the case of such an abnormal situation in which power is suddenly oversupplied, the bendable section should perform the bending motion within a set range inside the patient's body. Otherwise, the patient's internal organs may be damaged.

The stopper 520 structure of the present disclosure functions as a safety device that may ensure the safety of the patient by limiting the power supply range of the power providing part 450 so that the bending angle may only be operated within a set range even when an abnormal operation of the motor occurs.

In the specification (particularly, in claims) of the present disclosure, the use of the term "above" and similar denoting terms may correspond to both singular and plural forms. Furthermore, recitation of ranges of values herein are merely intended to refer to respective separate values falling within the respective ranges and, unless otherwise indicated herein, the respective separate values are incorporated herein as if individually recited herein.

The operations of any method described herein may be performed in any suitable order unless otherwise indicated herein or otherwise clearly contradicted by the context. However, the operations shall not be limited to the described sequence. The use of any examples or exemplary languages (e.g., "such as") provided herein is intended merely to better illustrate the present disclosure and does not pose a limitation on the scope of the present disclosure unless otherwise defined by the Claims. In addition, a person having ordinary knowledge in the art will appreciate that various modifications, combinations, and changes are possible according to design conditions and factors within the scope of the claims or equivalents thereof.

Therefore, the spirit of the present disclosure shall not be limited to the above-described embodiments, and the entire scope of the appended claims and equivalents thereof will fall within the scope and spirit of the present disclosure.

DESCRIPTION OF REFERENCE NUMERALS OF DRAWINGS

| | |
|---|---|
| 100: endoscope | 110: connector |
| 111: power receiving part | 112: first engagement portion |
| 113: base portion | 114: front cover |
| 115: opening | 120: universal cord |
| 130: control body | 131: controller |
| 140: insertion tube | 141: bendable section |
| 200: power providing part | 210: connector receptacle |
| 220: through-slot | 230: control panel |
| 240: housing | 250: control command receiver |
| 260: light source | 270: air pump |
| 280: light providing part | 300: power providing part |
| 310: body portion | |
| 320: second engagement portion | |
| 321: groove | 330: rack gear |
| 340: rail structure (power providing part engagement portion) | |
| 400: power providing part support | |
| 410: power source | 411: driving shaft |
| 412: pinion gear | |
| 420: location information collecting part | |
| 430: bottom fastener | 440: body portion |
| 441: driving shaft through-hole | |
| 450: power providing part receptacle | |
| 451: rail sidewall | 500: cover member |
| 510: rear support | 520: stopper |

The invention claimed is:

1. A power providing apparatus for a medical device, provided with a connector receptacle to which a connector of an endoscope is coupled, the apparatus comprising:
   a control panel disposed on a front portion of the power providing apparatus;
   a power source configured to generate power;
   a power transmission part configured to transmit the power generated by the power source;
   a power providing part configured to provide the power received from the power transmission part to the endoscope by performing a vertical linear motion;
   a power providing part support supporting the power providing part and having a power providing part engagement portion operably engaging the power providing part; and
   a rear support comprising a first rear support and a second rear support, wherein an entirety of the first rear support is disconnected from an entirety of the second rear support, wherein the rear support is disposed adjacent to the power providing part to inhibit rearward pushing of the power providing part,
   wherein the connector receptacle is disposed on the control panel,
   wherein the power providing part engagement portion includes rail engagement structures respectively formed on the power providing part support and the power providing part, each rail engagement structure engaging a corresponding rail structure on the power providing part with a predetermined gap defined between the rail engagement structure and the corresponding rail structure, and
   wherein the rear support is disposed at a predetermined distance apart from a rear of the power providing part so that further rearward pushing of the power providing part that has been pushed rearward due to the predetermined gap of the power providing part engagement portion is inhibited by the rear support, to prevent the rail engagement structure from being bent or broken and the vertical linear motion of the power providing part from being impeded by impact occurring in a process in which the connector of the endoscope moves in a first direction different from the vertical direction and is coupled to the connector receptacle.

2. The power providing apparatus of claim 1, wherein the endoscope comprises a first engagement portion configured to receive power, and the power providing part comprises a second engagement portion configured to interact with the first engagement portion to provide power to the first engagement portion.

3. The power providing apparatus of claim 2, wherein the first engagement portion comprises a first protrusion or a first recess, and the second engagement portion comprises a second recess corresponding to the first protrusion or a second protrusion corresponding to the first recess.

4. The power providing apparatus of claim 2, wherein the first engagement portion is disposed on the connector of the endoscope.

5. The power providing apparatus of claim 1, wherein the rear support is integrally formed with the power providing part support.

6. The power providing apparatus of claim 5, wherein the power providing part support comprises a power providing part receptacle formed to engage with the power providing part with a rail structure, and the rear support comprises a portion forming a rear side of the power providing part receptacle.

7. The power providing apparatus of claim 1, wherein the rear support is disposed opposite to a rear side of the power providing part.

8. The power providing apparatus of claim 1, wherein the endoscope comprises a bendable section inserted into the subject's body to perform bending motion in order to collect image information of the interior of the subject's body, wherein the motion of the power providing part has a range corresponding to a range of bending angles of the bendable section.

* * * * *